United States Patent
Barnes et al.

(10) Patent No.: US 7,253,384 B2
(45) Date of Patent: Aug. 7, 2007

(54) FOCUSING SYSTEM USING LIGHT SOURCE AND IMAGE SENSOR

(75) Inventors: Danny S. Barnes, Maple Valley, WA (US); David A. Marks, Auburn, WA (US); Gordon W. Lam, Renton, WA (US)

(73) Assignee: Microscan Systems Incorporated, Renton, WA (US)

( * ) Notice: Subject to any disclaimer, the term of this patent is extended or adjusted under 35 U.S.C. 154(b) by 0 days.

(21) Appl. No.: 11/088,362

(22) Filed: Mar. 23, 2005

(65) Prior Publication Data

US 2006/0214084 A1    Sep. 28, 2006

(51) Int. Cl.
*G02B 7/04* (2006.01)
*G03B 17/00* (2006.01)
*G03B 3/10* (2006.01)
*G01B 11/14* (2006.01)

(52) U.S. Cl. .............. 250/201.2; 396/80; 396/100; 356/624

(58) Field of Classification Search .. 250/201.1–201.4; 359/698, 697, 383; 396/80, 100, 103, 104, 396/120; 356/622, 624
See application file for complete search history.

(56) References Cited

U.S. PATENT DOCUMENTS

| | | | | |
|---|---|---|---|---|
| 5,319,442 | A * | 6/1994 | Rosser | ............ 356/615 |
| 5,391,866 | A * | 2/1995 | Hoshino et al. | ......... 250/201.2 |
| 5,612,740 | A | 3/1997 | Lee et al. | |
| 5,973,319 | A * | 10/1999 | Washisu | ............ 250/231.13 |
| 6,225,614 | B1 * | 5/2001 | Ono | ............ 250/201.5 |
| 6,277,067 | B1 * | 8/2001 | Blair | ............ 600/167 |
| 6,297,488 | B1 * | 10/2001 | Beraldin et al. | ......... 250/201.2 |
| 6,307,636 | B1 * | 10/2001 | Spink | ............ 356/614 |
| 6,476,979 | B1 * | 11/2002 | Schaack | ............ 359/738 |
| 6,501,909 | B1 * | 12/2002 | Nishimura et al. | ............ 396/74 |
| 2003/0063209 | A1 | 4/2003 | Enomoto et al. | |
| 2003/0218125 | A1 * | 11/2003 | Igaki et al. | ............ 250/231.13 |
| 2005/0259155 | A1 | 11/2005 | Okada | |

FOREIGN PATENT DOCUMENTS

| | | |
|---|---|---|
| DE | 20003760 U1 | 4/2000 |
| EP | 0532169 A1 | 3/1993 |
| EP | 0814317 A1 | 12/1997 |
| JP | 2003255278 | 9/2003 |
| JP | 2004325827 | 11/2004 |
| WO | PCT/US2006/009632 | 7/2006 |

\* cited by examiner

*Primary Examiner*—Thanh X. Luu
*Assistant Examiner*—Brian J Livedalen
(74) *Attorney, Agent, or Firm*—Blakely Zokoloff Taylor & Zafman LLP

(57) ABSTRACT

An apparatus comprising a movable optical element having an optical axis and including one or more focusing elements, an image sensor positioned along the optical axis and substantially normal thereto, and a radiation source attached to the movable optical element, wherein the radiation source directs a beam of radiation onto the sensor at a selected angle relative to the optical axis. A process comprising positioning a sensor along, and normal to, an optical axis of a movable optical element, projecting a radiation beam onto the sensor from a radiation source attached to the movable optical element, wherein the radiation beam is at a selected angle relative to the optical axis, and adjusting the position of the movable optical element until the position where the radiation beam falls on the sensor corresponds to the position where the radiation beam is expected to fall on the sensor when the movable optical element is in focus. Other embodiments are disclosed and claimed.

40 Claims, 6 Drawing Sheets

FIG. 3A   FIG. 3B

FOCUSING SYSTEM USING LIGHT SOURCE AND IMAGE SENSOR

TECHNICAL FIELD

The present invention relates generally to focusing imaging devices and in particular, but not exclusively, to a focus feedback apparatus using an imaging sensor and a light source.

BACKGROUND

FIG. 1 illustrates a simple lens system 100 in which a lens 102 focuses an image of an object 104 onto an image plane 106. The object 104 is a front focus distance $f_f$ from the lens, while the image plane 106 is a back focus distance $f_b$ from the lens. For the lens 102 to maintain an optimally focused image on the image plane 106, the laws of optics dictate a certain relationship between $f_f$ and $f_b$—in other words, for a given $f_f$ there is a specific value of $f_b$ that must be maintained for an image to be properly focused on the image plane 106.

What is true of the very simple lens system 100 is also true of more complex focusing systems: for a given $f_f$ there is a specific value of $f_b$ that must be maintained. In devices including more complex focusing elements, however, various factors such as thermal expansion, mechanical part tolerances, and the like may cause the focusing elements to move, thus altering the values of $f_f$ and $f_b$ and affecting the quality of the focused image. To correct these movements of the focusing elements, some devices incorporate movable optical elements whose positions are controlled by a control system. The control system senses when the image is going out of focus and adjusts the position of the movable optical elements until $f_f$ and $f_b$ are returned to their proper values and, as a result, the image is returned to optimal focus.

Before a control system can work properly, though, it must have some way of detecting the position of the movable optical element. The most common way of detecting the position of the movable optical element uses mechanical sensors. Mechanical sensors, however, tend to be bulky, expensive, and difficult to integrate into small systems. Since they are mechanical, their accuracy is also limited because of mechanical tolerances within the sensor and, moreover, the sensors are also subject to inaccuracies brought on by factors such as thermal expansion. Optically-based position sensors have been developed, but these are also bulky and expensive and depend mostly on measuring the front focal distance $f_f$ by, for example, transmitting and receiving a signal and measuring the delay to compute the distance. There is therefore a need in the art for an apparatus and method that accurately measures positions of a movable focusing element while being inexpensive, compact, and easy to integrate into optical systems.

SUMMARY OF THE INVENTION

The present application discloses an embodiment of an apparatus comprising a movable optical element having an optical axis and including one or more focusing elements, an image sensor positioned along the optical axis and substantially normal thereto, and a radiation source attached to the movable optical element, wherein the radiation source directs a beam of radiation onto the sensor at a selected angle relative to the optical axis. The application also discloses an embodiment of a process comprising positioning a sensor along, and normal to, an optical axis of a movable optical element, projecting a radiation beam onto the sensor from a radiation source attached to the movable optical element, wherein the radiation beam is at a selected angle relative to the optical axis, and adjusting the position of the movable optical element until the position where the radiation beam falls on the sensor corresponds to the position where the radiation beam is expected to fall on the sensor when the movable optical element is in focus. These, as well as other embodiments, are disclosed and claimed.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 3A-3C are drawings showing the movement of the movable optical element in the embodiment of FIG. 2, as well as the corresponding movement of the spot created where the radiation beam falls upon an optical sensor.

FIG. 5A illustrates the movement of the spot on the optical sensor, while FIG. 5B is a flowchart illustrating the process by which the back focal length is maintained.

DETAILED DESCRIPTION OF THE ILLUSTRATED EMBODIMENTS

Embodiments of an apparatus and method for focusing an imaging device using a light source and a sensor are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1:
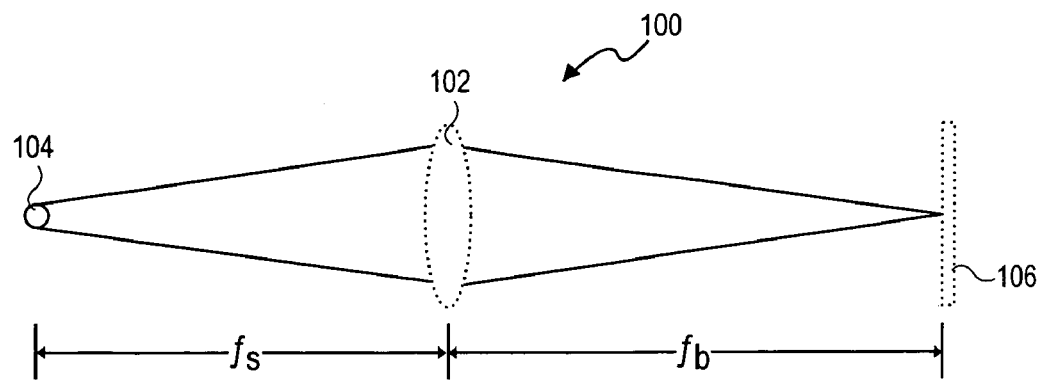
FIG. 1 is a simplified schematic drawing of a focusing element illustrating its front and back focal lengths.
Figure 2:
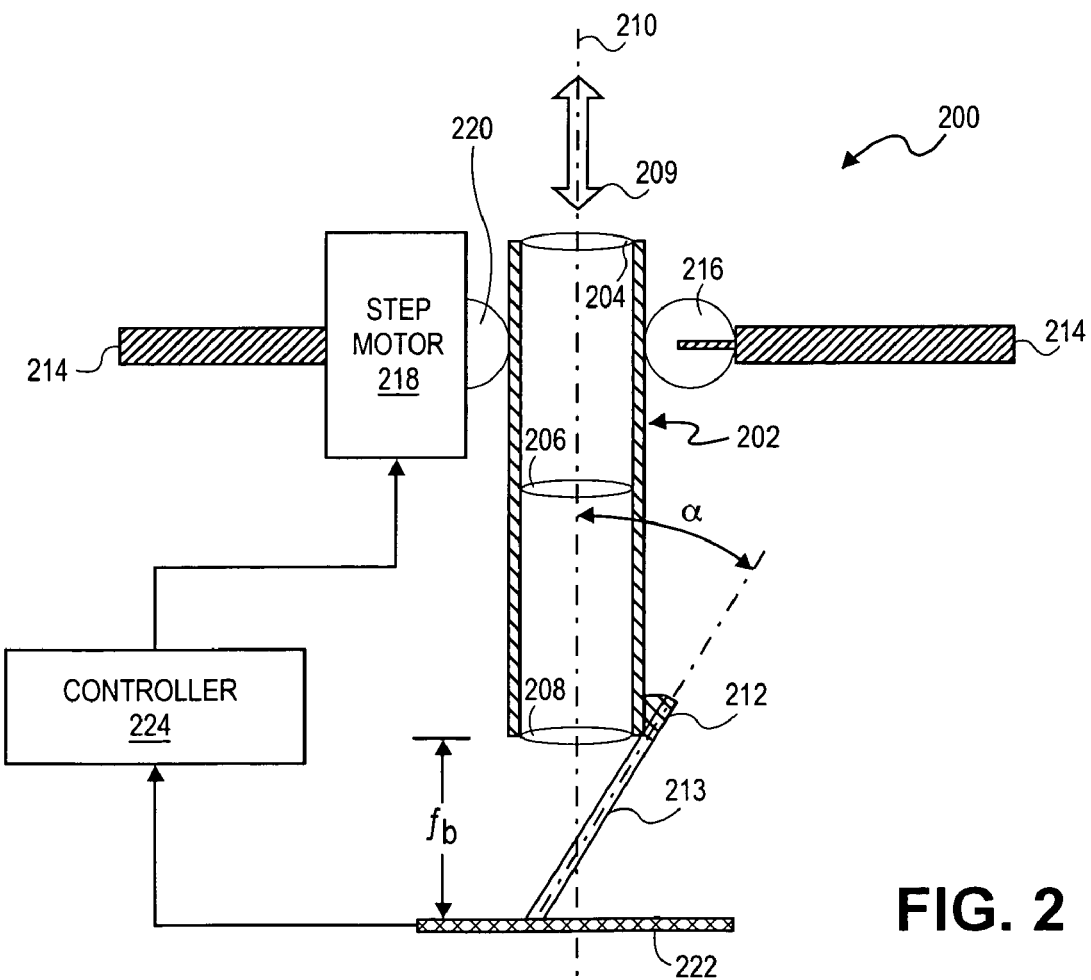
FIG. 2 is a schematic drawing of an embodiment of the present invention.

FIG. 2 schematically illustrates an embodiment of the present invention comprising a focus feedback system 200. The system 200 includes a movable optical element 202 mounted in a housing or support 214. A step motor 218 is coupled to the movable optical element 202 via a motion transfer mechanism 220. The movable optical element 202 focuses an image of an object (not shown) onto image sensor 222; each front focus distance $f_f$ between the object and the movable optical element will have a corresponding back focal length $f_b$ between the movable optical element and the image sensor 222. A radiation source 212 is attached to the movable optical element 202 in such a way that it directs a radiation beam 213 onto the image sensor 222 at a selected angle cc relative to the optical axis 210. A controller 224 is coupled to the output of the image sensor 222 and to the step motor 218, such that the controller 224 can control the motion of the step motor 218 in response to the position where the radiation beam 213 falls on the image sensor 222.

The primary function of the movable optical element 202 is to focus an image of an object (not shown in the drawing) onto the image sensor 222. To assure that a properly focused image can be created on the sensor for objects at variable front focus distances from the movable optical element 202, the movable optical element is capable of back-and-forth motion substantially along its own optical axis 210, as illustrated by the arrows 209. In the embodiment shown, the movable optical element 202 is a compound optical element including three focusing elements 204, 206 and 208 aligned along the optical axis 210. In other embodiments, the movable optical element 202 can contain more or less focusing elements and the focusing elements can be arranged differently within the movable optical element. Moreover, the focusing elements 204, 206 and 208 are shown in the figures as refractive focusing elements, but in other embodiments the focusing elements can also be diffractive elements or reflective elements. Still other embodiments can use combinations of refractive, diffractive and reflective focusing elements.

A radiation source 212 is attached to the movable optical element 202. The radiation source 212 is positioned such that it emits a radiation beam 213 at a selected angle a relative to the optical axis 210 of the movable optical element. The radiation source 212 can include elements therein that focus or collimate the emitted beam. In a case where the emitted beam is collimated, a substantially elliptical radiation spot is thus created where the radiation falls on the sensor. For maximum sensitivity, the selected angle a can be chosen to maximize the travel of the radiation spot across the sensor as the movable optical element 202 travels through its range of motion (see FIGS. 3A-3B), and will thus depend on parameters such as the size of the sensor, the distance between the movable optical element and the sensor, and the how far the movable optical element can move along its axis. In one embodiment α has a value of 62.5 degrees, but in other embodiments the value of α can, of course, be different.

In the embodiment shown, the radiation source 212 is attached to the exterior of the movable optical element 202 substantially at the end of the optical element closest to the sensor. In other embodiments, however, the radiation source can be positioned elsewhere on the movable optical element, or on the sensor plane directed toward the movable optical element 202 and reflected back to the image sensor 222, so long as the radiation beam emitted by the radiation source can reach the sensor. In one embodiment, the radiation emitted by the radiation source 212 can be in the visible portion of the spectrum; an example of a radiation source is a light-emitting diode (LED). In other embodiments, however, the emitted radiation can be in portions of the spectrum outside the visible range, such as the infra-red or ultraviolet ranges of the spectrum.

So that the optical element 202 can move along its axis 210, it is held in the opening in housing 214 by elements that support the movable optical element 202 while allowing its motion along the optical axis 210. In the embodiment shown, the movable optical element is supported in the housing 214 by rollers 216, but in other embodiments the movable optical element could be supported in the housing by other means, or could be supported by means unattached to the housing 214.

Step motor 218 is coupled to a motion transfer mechanism 220, and motion transfer mechanism 220 is in turn also coupled to the movable optical element 220. When the step motor 218 is activated, its motion drives the motion transfer mechanism 220, and the motion transfer mechanism then translates the motion of the motor into linear motion of the movable optical element 202, substantially back and forth along its own optical axis 210, as indicated by the arrows 209. In an embodiment where the motion of the step motor 218 is rotational, the motion transfer mechanism 220 can be an element that translates the rotational motion of the motor into linear motion of the movable optical element 202; examples of suitable motion transfer mechanisms include cams, gears, friction wheels, worm gears, rack-and-pinion assemblies, or combinations of these and/or other such mechanisms. In an alternative embodiment where the motion of the motor 218 is linear, the motion transfer mechanism can be as simple as a rigid element that connects the motor to the movable optical element, or can be a more complex mechanism also including cams, gears, friction wheels, worm gears, rack-and-pinion assemblies, or combinations of these and/or other such mechanisms.

Image sensor 222 can be any sensor capable of capturing an image focused on it by the movable optical element 202. In one embodiment, the image sensor 222 is a digital sensor including an array of pixels, for example a 1.3 megapixel array, capable of capturing a two-dimensional image. Examples of suitable sensors include charge-coupled device (CCD) arrays, complimentary metal oxide semiconductor (CMOS) sensors, photodetectors, and the like. In other embodiments, however, other types of sensors can be used.

Controller 224 is coupled to the output of the image sensor 222 and is also coupled to the step motor 218, thus creating a closed control loop. As further described below in conjunction with FIGS. 5A-5B, the controller 224 analyzes the output of the sensor, including the position of the spot created by the radiation source 212, and uses this information to control the step motor 218. Thus, the controller 224 uses the spot position information for functions such as moving the movable optical element to the proper back focal length and maintaining the proper back focal length once it is found. In the embodiment shown, the controller is a physically separate unit from the image sensor 222, but in other embodiments the two can both be part of the same unit. For example, in a processor with an integrated sensor, the controller could be implemented in the processor. Moreover, the controller can be implemented in either hardware or software.

Figure 3C:
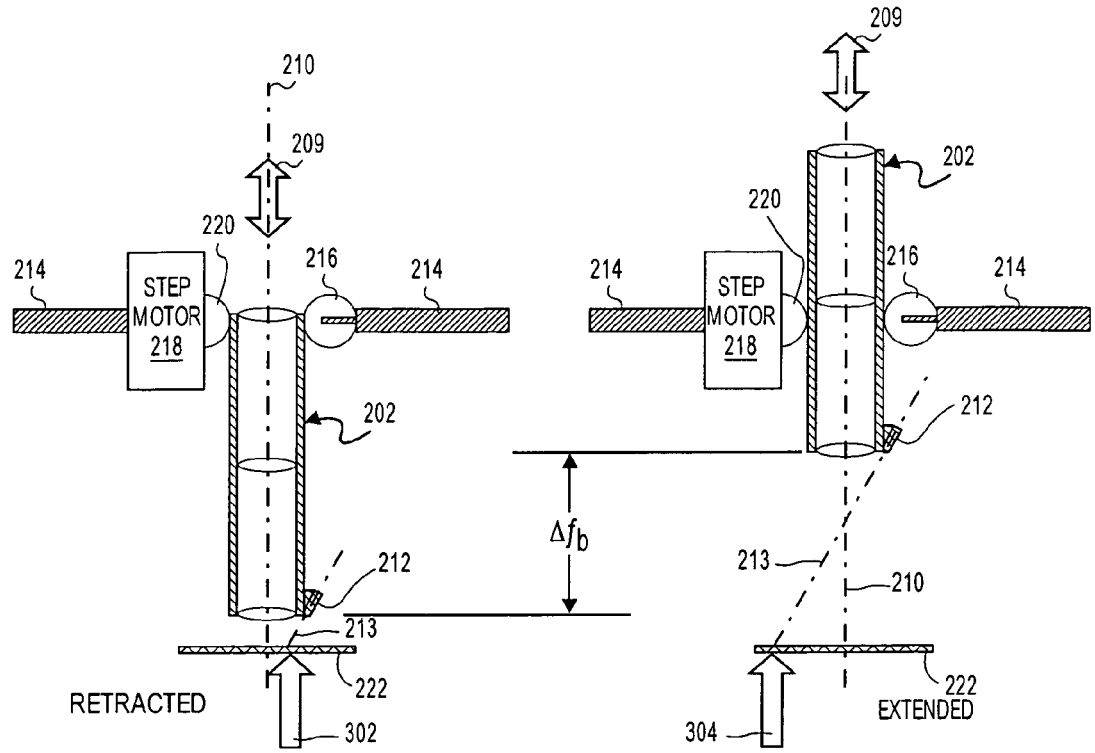
Figure 3C:
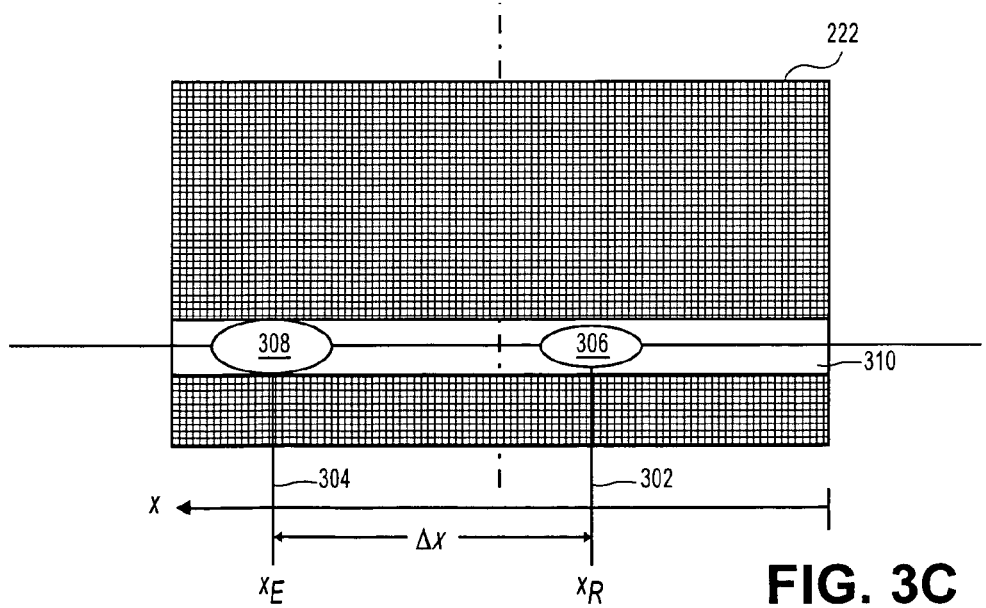

FIGS. 3A-3C illustrate an embodiment of the motion of the movable optical element 202 and the corresponding movement across the image sensor 222 of the spot created by the radiation source 212. The dimensions shown in the drawing are exaggerated for clarity; in many practical applications, distances such as $\Delta f_b$ and $\Delta x$ will actually be quite small. FIG. 3A illustrates the movable optical element 202 in a retracted position, such that the center of the spot is at position $x_R$, marked by arrow 302. FIG. 3B illustrates the movable optical element 202 in an extended position, the movable optical element having traveled a distance $\Delta f_b$ from its retracted position. With the movable optical element 202 in an extended position, the spot has move across the sensor to a position $x_E$, marked in the figure by arrow 304. Thus, a movement of the movable optical element through a distance $\Delta f_b$ causes the spot to move a distance $\Delta x = x_E - x_R$ across the image sensor 222. As long as the angle α remains constant, the relationship between $\Delta f_b$ and $\Delta x$ will be linear.

FIG. 3C illustrates the movement of the spot across the image sensor 222. When the movable optical element 202 is in a retracted position, the spot 306 is on the sensor at position $x_R$. As the movable optical element 202 moves away from the image sensor 222, the spot moves and becomes spot 308 at position $x_E$. Spot 308 is shown as being larger than spot 306; this tendency for the spot to grow (i.e., change area) will occur in cases where the beam emitted by the radiation source 212 is either un-collimated or imperfectly collimated. The change in area between spot 308 and spot 306 can useful, since it can provide additional spot movement information that can be used by the controller 224. Another feature illustrated in the figure is that once the positions and sizes of the spots as they move across the sensor are established, only that part of the sensor in which the spot travels need be analyzed. In terms of the figure, then, the controller need not analyze information from the entire sensor; instead, it can save effort by only analyzing the portion 310 of the sensor that bounds the path and size of the spots.

Figure 4:
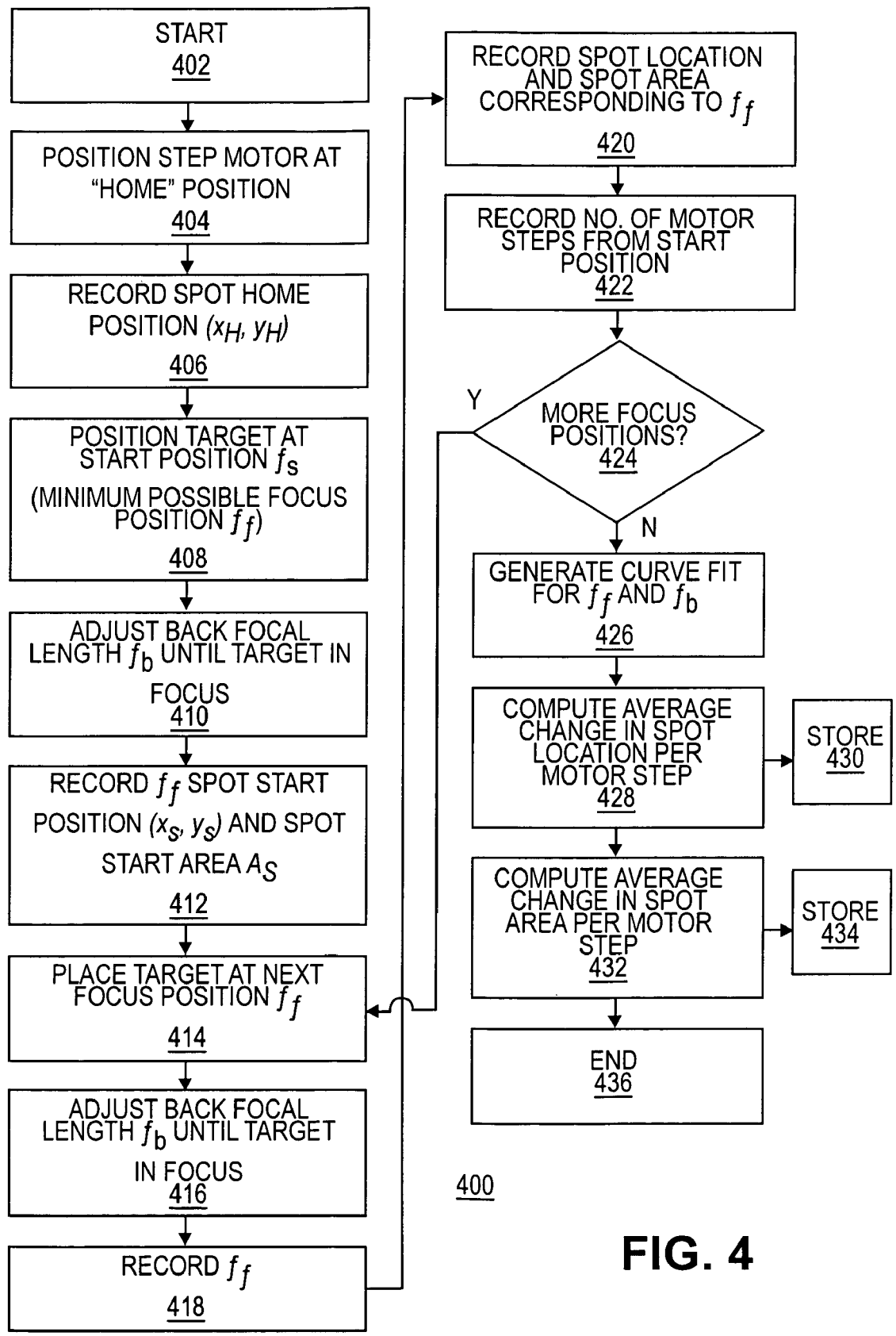
FIG. 4 is a flowchart illustrating an embodiment of a process for calibrating the embodiment of the invention shown in FIG. 2.

FIG. 4 illustrates an embodiment of a process 400 for calibrating the focus feedback system 200 shown in FIG. 2. The process starts at box 402. At box 404 the step motor is positioned at a home position, and at box 406 the corresponding home position $(x_H, y_H)$ of the spot on the image sensor 222 is recorded. The location of the spot can be characterized using the x and y coordinates of its center, usually measured in pixels from a specified origin of the image sensor 222. At box 408, a target is positioned in front of the movable optical element at the minimum front focus distance $f_f$ for which the system is capable of focusing; this is referred to as the start position $f_s$. At box 410, the movable optical element 202 is moved to adjust the back focal length $f_b$ until the target is in focus, and at box 412 the spot start position $(x_S, y_S)$, start area $A_s$ and $f_f$ are recorded. The spot area will usually also be measured in pixels.

At box 414, the target is placed at the next focus position $f_f$ to be used in the calibration. At box 416, the movable optical element 202 is moved to adjust the back focal length $f_b$ until the target is in focus, at which point the values of $f_f$ is recorded at box 418. At box 420, the location and area of the spot on the sensor are recorded, and at box 422 the number of steps the step motor 218 took between the start position and the current position are recorded. The number of steps taken by the step motor between the start position and the current position serves as a measure of the back focal length $f_b$ at the current spot location. At box 424, the process checks whether there are more focus positions to be included in the calibration. Usually, there must be a minimum of three focus distances to produce a proper calibration. If there are more focus distances for the calibration, the process returns to box 414 and repeats boxes 414-422 for that focus position.

When there are no more focus positions for the calibration, the process continues from box 424 to box 426, where the front and back focus distances are correlated, for example by fitting a curve to the recorded values of $f_f$ and $f_b$, with $f_b$ referenced in motor steps relative to the start position. Once the curve is fit, the proper $f_b$ value can be found for any value of $f_f$, not just for the specific values of $f_f$ collected during calibration. In other embodiments, however, other means can be used to correlate $f_f$ and $f_b$. For example, the collected values of $f_f$ and $f_b$ can be stored in a table, and a value of $f_b$ for any $f_f$ can be computed by interpolation between the values in the table. Likewise, the spot position could be recorded for each calibrated object distance and correlated to $f_f$, and fit to a curve in the same manner described above.

At box 428, the data collected for the spot location and the data collected for the motor location are used to calculate an average change in spot location per motor step—in other words, how far the spot moves, on average, for each movement of the step motor. This value is stored at box 430 and the process continues to box 432 where the data collected for the spot area and the data collected for $A_s$ are used to calculate an average change in spot area per motor step—in other words, how much the spot's area changes, on average, for each movement of the step motor. The value is stored at box 434, and the calibration process is completed at box 436.

Figure 5A:
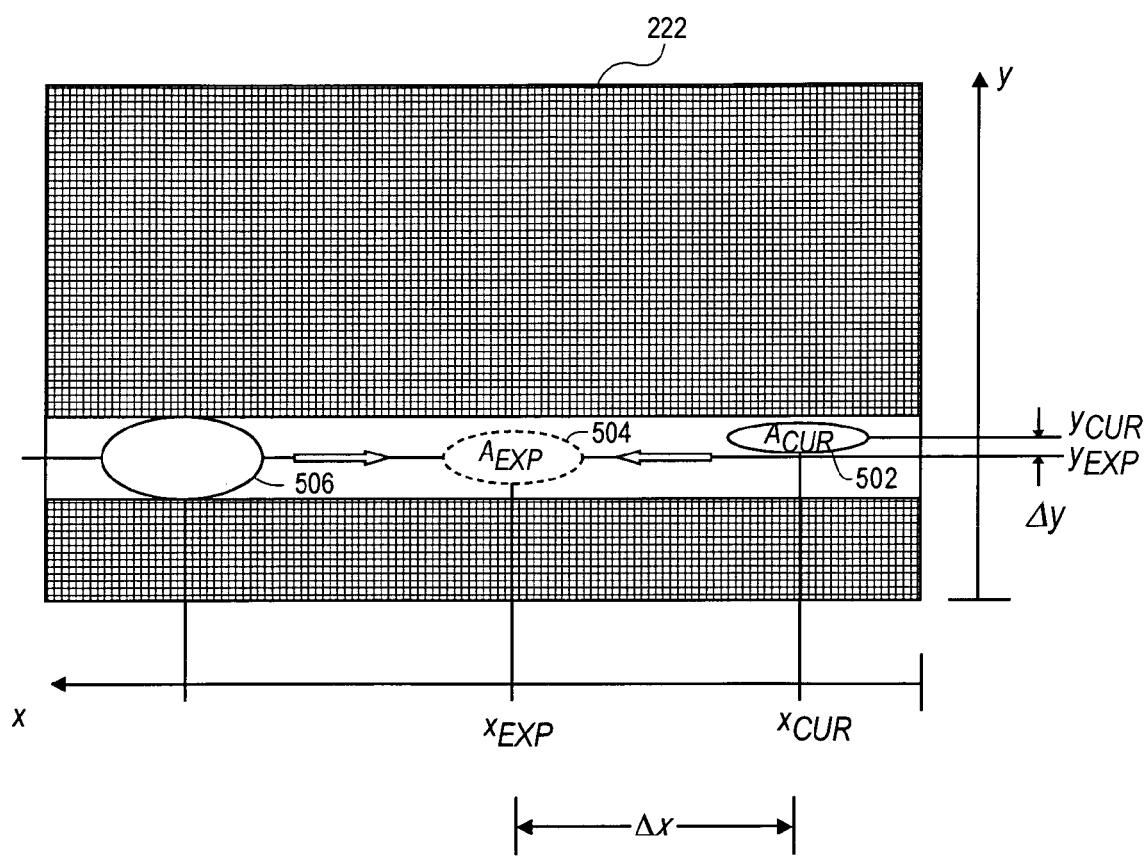
FIGS. 5A-5B illustrate an embodiment of the operation of the embodiment shown in FIG. 2.
Figure 5B:
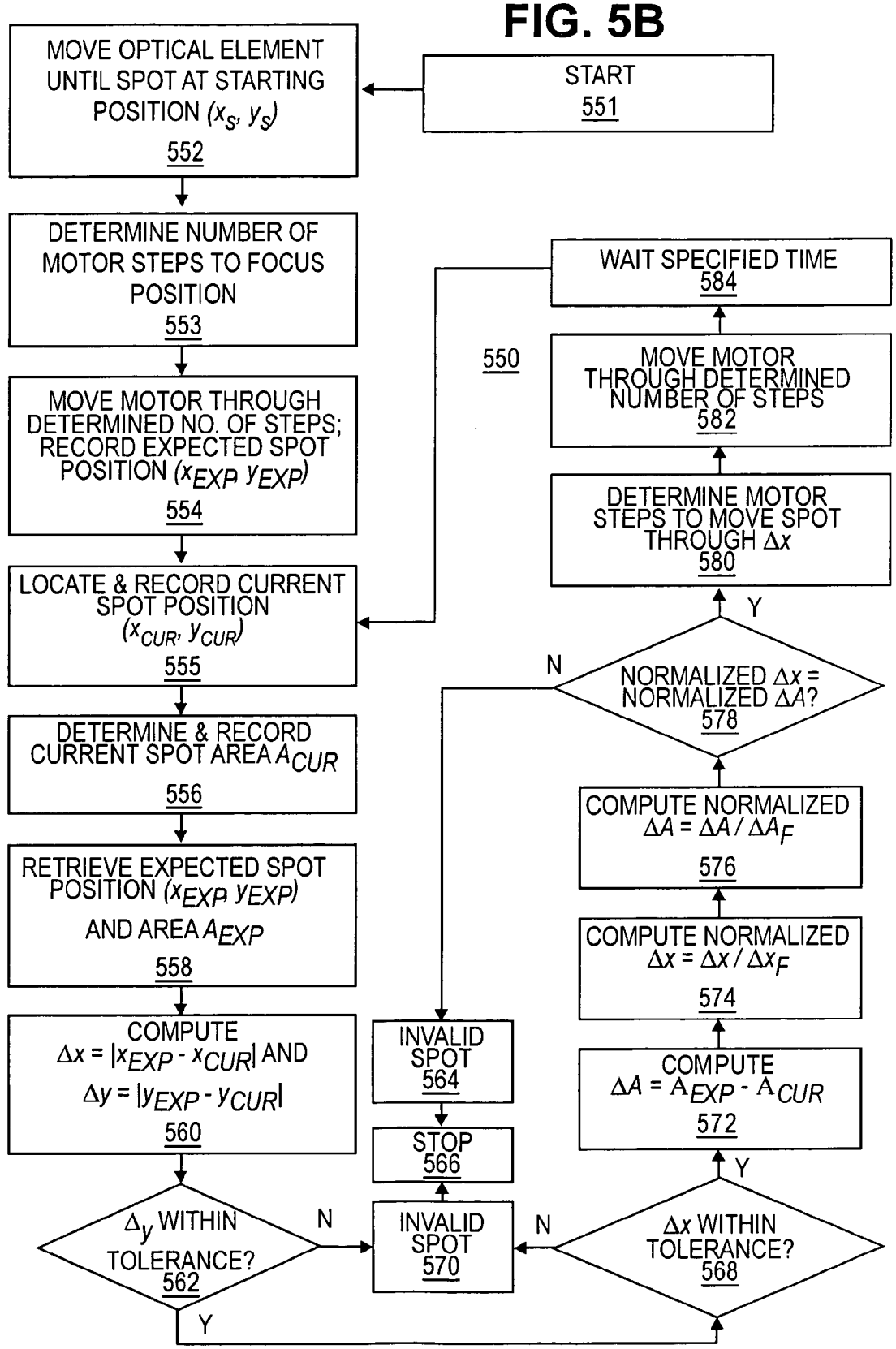

FIGS. 5A and 5B illustrate an embodiment of the operation of the focus feedback system 200. FIG. 5A illustrates the movement of the spot on the sensor 222. All dimensions in the figure are exaggerated for clarity;

in practice, the dimensions and spot movements are likely to be much smaller than shown. When the system 200 is started up, it uses the information collected during calibration to position the movable optical element 202 to the proper back focal length. This is done by first moving the optical element 202 until the spot on the sensor is in the proper position for the recorded starting position $(x_S, y_S)$. Then, using the curve that was generated during calibration, the number of steps required to set the proper back focal length is determined, and the optical element 202 is moved to the desired position. The spot location and area are then recorded. This is the "expected" spot location 504.

During operation of the system, thermal expansion, mechanical movements and various other factors may cause the movable optical element 202 to move, thus changing the back focal length and causing the spot to drift from the expected spot location 504 to a "current" spot location, such as spot location 502 or 506. The main goal of the feedback system is to maintain the proper back focal length for the movable optical element 202. It does this by adjusting the position of the optical element until the position and area of the current spot 502 or 506 substantially coincides with the expected spot position 504.

When the spot is at the expected spot position 504, it will be located at coordinates $(x_{EXP}, y_{EXP})$ and will have an expected area $A_{EXP}$. Using the current spot position 502 as an example, if the movable optical element drifts during operation the spot will move to current spot location 502 with coordinates $(x_{CUR}, y_{CUR})$, at which location the spot will have an area $A_{CUR}$. Thus, the spot has drifted horizontally from its expected location by a distance $\Delta x$ and vertically by a distance $\Delta y$, and its area differs from the expected area by an amount $\Delta A$. Using an embodiment of a process such as the one shown in FIG. 5B in conjunction with the information collected during calibration, the feedback system then moves the movable optical element 202 until the spot moves from its current position 502 to the expected position 504.

FIG. 5B illustrates, with reference to FIG. 5A, an embodiment 550 of the operation of the focus feedback system 200. The process starts at box 551 and proceeds to box 552, where the movable optical element 202 is moved until it is in the starting position. At box 553 the process determines, based on the calibration, the number of motor steps needed to move the optical element 202 from the starting position to the focus position. The optical element 202 is moved to the focus position and the spot location and area are then recorded. This is the "expected" spot location 504, with coordinates ($x_{EXP}$, $y_{EXP}$) and area $A_{EXP}$.

After a specified delay, at box 555 the coordinates ($x_{CUR}$, $y_{CUR}$) of the spot's current location 502 are determined and recorded; as described above, the location of the spot is determined by the location of its center, usually measured in number of pixels from a specified origin on the sensor. At box 556, the current area $A_{CUR}$ of the spot 502 is determined and also recorded. At box 558, the coordinates ($x_{EXP}$, $y_{EXP}$) of the spot's expected location 504 are retrieved for the focus distance at which the system is operating, as well as the expected area $A_{EXP}$ of the spot 504. At box 560, the process computes offsets $\Delta x$ and $\Delta y$ that quantify the distance by which the actual position of the spot differs from its expected position.

Having computed the offsets $\Delta x$ and $\Delta y$, the process next uses these values to check whether the spot 502 is valid. At box 562, the process compares the value of $\Delta y$ with a specified tolerance. If the value of $\Delta y$ exceeds the specified tolerance, the process determines at box 570 that the spot is invalid and stops at box 566. If the value of $\Delta y$ is within the specified tolerance, then the process continues to box 568, where it compares the value of $\Delta x$ with a specified tolerance. If the value of $\Delta x$ exceeds the specified tolerance, then the process determines at box 570 that the spot is invalid and stops at box 566.

If the spot 502 is found to be valid using the values of $\Delta x$ and $\Delta y$, the process continues to box 572, where it computes a value for $\Delta A$, the difference between the actual spot area and the expected spot area for the given focus position. At box 574, the process normalizes the value of $\Delta x$ using a normalization factor $\Delta x_F$, while at box 576 it normalizes the value of $\Delta A$, using a different normalization factor $\Delta A_F$. At box 578, the process compares the normalized values of $\Delta x$ and $\Delta A$. If the normalized values are not equal, then the process determines at box 564 that the spot is invalid and the process stops at box 566. If the normalized values $\Delta x$ and $\Delta A$ are equal, then the spot is valid and the process continues to box 580 where it determines, based on the calibration, the number of motor steps it will take to move the spot 502 through the distance $\Delta x$, so that the spot 502 can move to its expected position 504. After determining the necessary number of motor steps, at box 582 the process steps the motor through the appropriate number of steps to return the spot to its expected position 504. Finally, the process continues to box 584, where it waits for a specified amount of time before returning to box 555 and proceeding through boxes 555-582 again.

Figure 6:
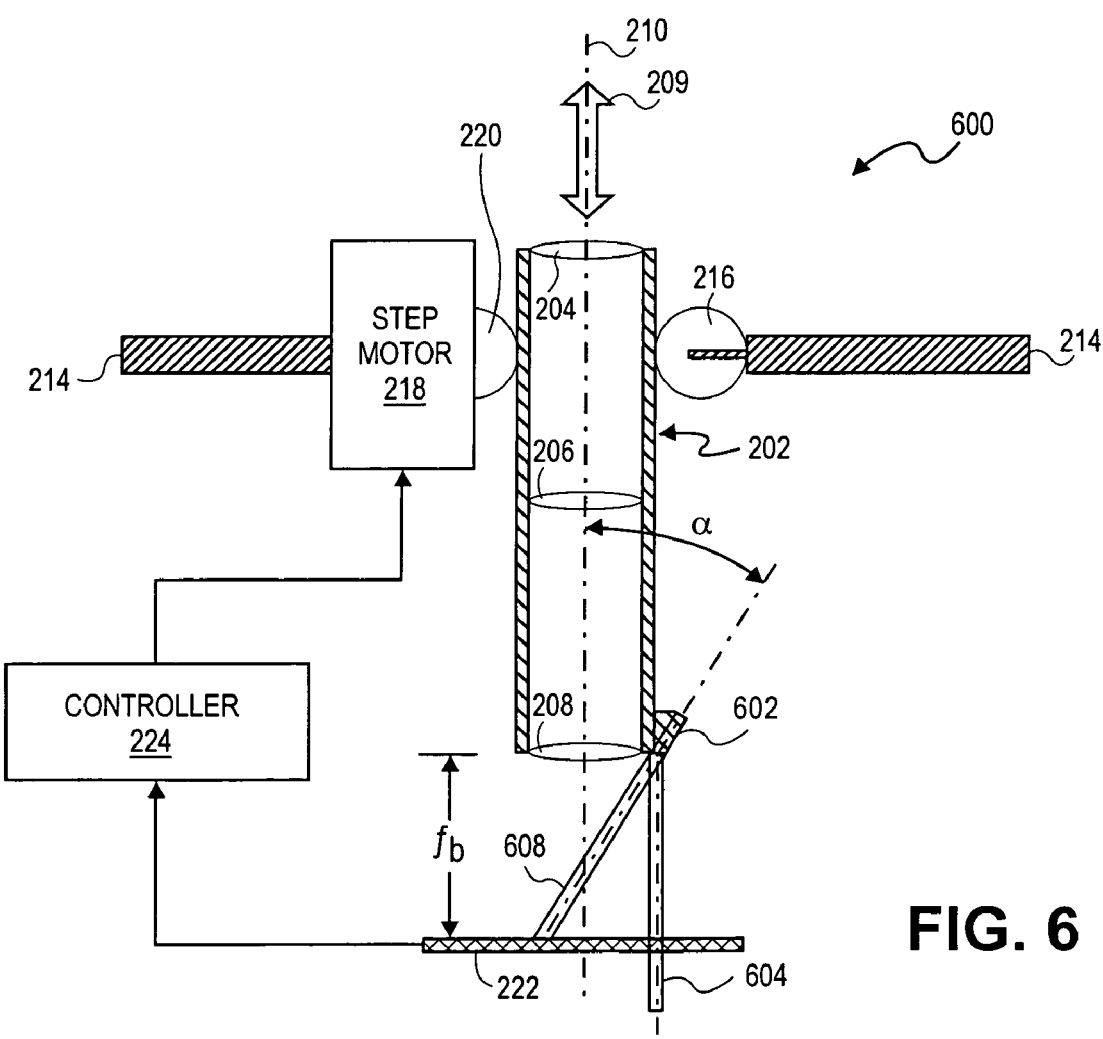
FIG. 6 is a schematic drawing of an alternative embodiment of the present invention.

FIG. 6 illustrates an alternative embodiment of a focus feedback system 600. The focus feedback system 600 is similar to the focus feedback system 200 described in connection with FIG. 2. The primary difference between the two is in the way radiation from the radiation source is directed onto the sensor 222. In the system 600, a radiation source 604 is positioned along the image plane of the sensor and is pointed toward a reflector 602 attached to the movable optical element 202. The radiation source 604 directs a beam of radiation 606 onto the reflector 602, and the reflector 602 re-directs the beam 606 into beam 608 that is at a selected angle $\alpha$ relative to the optical axis 210 of the movable optical element. The beam 608 is then directed onto the sensor 222. In other embodiments, the radiation source can be positioned differently, so long as the beam 606 falls on the reflector 602 and the beam 608 falls on the sensor 222 throughout the range of motion of the movable optical element 202. The focus feedback system 600 can be calibrated and operated substantially as described above for the focus feedback system 200.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification. Rather, the scope of the invention is to be determined entirely by the following claims, which are to be construed in accordance with established doctrines of claim interpretation.

The invention claimed is:

1. An apparatus comprising:
   a movable optical element having an optical axis and including one or more focusing elements;
   an image sensor positioned along the optical axis, wherein the movable optical element is movable relative to the image sensor; and
   a radiation source attached to the movable optical element, wherein the radiation source directs a beam of radiation onto the image sensor at a selected angle relative to the optical axis.

2. The apparatus of claim 1, further comprising a drive mechanism coupled to the movable optical element to move the movable optical element along the optical axis.

3. The apparatus of claim 2, further comprising a controller coupled to the image sensor and to the drive mechanism, wherein the controller controls the movement of the drive mechanism based on the position where the beam of radiation strikes the image sensor.

4. The apparatus of claim 2 wherein the drive mechanism comprises:
   a motor; and
   a motion transfer mechanism coupled to the motor and to the movable optical element, wherein the motion transfer mechanism converts the motion of the motor into linear motion of the movable optical element along the optical axis.

5. The apparatus of claim 4 wherein the motion transfer mechanism comprises one or more of a friction wheel, a worm gear, a gear and a cam.

6. The apparatus of claim 1 wherein the beam of radiation is substantially collimated.

7. The apparatus of claim 1 wherein the one or more focusing elements can include refractive, diffractive or reflective focusing elements, or combinations thereof.

8. The apparatus of claim 1 wherein the radiation source emits a beam in the visible part of the spectrum.

9. The apparatus of claim 8 wherein the radiation source is a light-emitting diode (LED).

10. A process comprising:
    positioning an image sensor along an optical axis of a movable optical element;
    projecting a radiation beam from the movable optical element onto the image sensor, wherein the radiation beam is at a selected angle relative to the optical axis; and
    adjusting the position of the movable optical element relative to the image sensor until the position where the radiation beam falls on the image sensor corresponds to the position where the radiation beam is expected to fall on the image sensor when the movable optical element is in focus.

11. The process of claim 10 wherein projecting a radiation beam from the movable optical element onto the image sensor comprises projecting a radiation beam from a radiation source attached to the movable optical element.

12. The process of claim 10 wherein projecting a radiation beam from the movable optical element onto the image sensor comprises using a reflector attached to the movable optical element to reflect the radiation beam onto the image sensor.

13. The process of claim 10 wherein adjusting the position of the movable optical element comprises:
    determining the current position where the radiation beam falls on the image sensor;
    determining the expected position where the radiation beam falls on the image sensor when the movable optical element is in focused; and
    based on the difference between the current and expected positions, activating a step motor coupled to the movable optical element through a number of steps needed to move the position where the radiation beam falls from the current position to the expected position.

14. The process of claim 13, wherein the radiation beam creates a spot on the image sensor and wherein the activation of the step motor coupled to the movable optical element is also based on the difference between the area of the spot in the current position and the area of the spot in the expected position.

15. The process of claim 13 wherein activating a step motor coupled to the movable optical element comprises:
    using the step motor to cause motion of a motion transfer mechanism;
    transferring the motion of the motion transfer mechanism to the movable optical element.

16. The process of claim 13, further comprising determining the average movement per motor step of the position where the radiation beam falls on the image sensor.

17. The process of claim 10, further comprising substantially collimating the radiation beam.

18. The process of claim 10 wherein determining the current position where the radiation beam falls on the image sensor comprises analyzing only a portion of the image sensor.

19. A process comprising:
    projecting a radiation beam from a movable optical element onto an image sensor positioned along an optical axis of the movable optical element, wherein the radiation beam is projected at a selected angle relative to the optical axis;
    positioning a plurality of targets at known front focus distances from the movable optical element; and
    for each front focus distance, determining and recording a back focal length of the movable optical element and the position where the beam of radiation falls on the image sensor.

20. The process of claim 19 wherein projecting a radiation beam from the movable optical element onto the image sensor comprises projecting a radiation beam from a radiation source attached to the movable optical element.

21. The process of claim 19 wherein projecting a radiation beam from the movable optical element onto the image sensor comprises using a reflector attached to the movable optical element to reflect the radiation beam onto the image sensor.

22. The process of claim 19 wherein determining the back focal length comprises:
    adjusting the position of the movable optical element until an image of the target on the image sensor is in focus; and
    determining the distance between the movable optical element and the image sensor.

23. The process of claim 19 wherein the radiation beam creates a spot where it falls on the image sensor.

24. The process of claim 23 wherein the position where the radiation beam falls on the image sensor is approximately the position of the center of the spot.

25. The process of claim 24, further comprising determining and recording the area of the spot.

26. The process of claim 19, further comprising correlating front focus position to back focus position.

27. The process of claim 26 wherein correlating the front focus position to the back focus position comprises fitting a curve to the recorded values of front focus position and back focus position.

28. The process of claim 19 wherein the movable optical element has a step motor coupled thereto by a motion transfer mechanism, and further comprising recording the step motor position for each front focus position.

29. The process of claim 28 further comprising correlating the position of the step motor to the position where the radiation beam falls on the image sensor.

30. The process of claim 29 wherein correlating the position of the step motor to the position where the radiation beam falls on the image sensor comprises computing an average movement per motor step of the position where the radiation beam falls on the image sensor.

31. An apparatus comprising:
    a movable optical element having an optical axis and including one or more focusing elements;
    an image sensor positioned along the optical axis, wherein the movable optical element is movable relative to the image sensor; and
    a reflector attached to the movable optical element, wherein the reflector directs a beam of radiation from a radiation source onto the image sensor at a selected angle relative to the optical axis.

32. The apparatus of claim 31, further comprising a drive mechanism coupled to the movable optical element to move the movable optical element along the optical axis.

33. The apparatus of claim 32, further comprising a controller coupled to the image sensor and to the drive mechanism, wherein the controller controls the movement of the drive mechanism based on the position where the beam of radiation strikes the image sensor.

34. The apparatus of claim 32 wherein the drive mechanism comprises:
    a motor; and
    a motion transfer mechanism coupled to the motor and to the movable optical element, wherein the motion transfer mechanism converts the motion of the motor into linear motion of the movable optical element along the optical axis.

35. The apparatus of claim 34 wherein the motion transfer mechanism comprises one or more of a friction wheel, a worm gear, a gear and a cam.

36. The apparatus of claim 31 wherein the beam of radiation is substantially collimated.

37. The apparatus of claim 31 wherein the one or more focusing elements can include refractive, diffractive or reflective focusing elements, or combinations thereof.

38. The apparatus of claim 31 wherein the radiation source emits a beam in the visible part of the spectrum.

39. The apparatus of claim 38 wherein the radiation source is a light-emitting diode (LED).

40. The apparatus of claim 31 wherein the radiation source is positioned in the plane of the image sensor.

* * * * *